April 18, 1950 W. L. TRACY 2,504,166
GIMBAL MOUNTING STRUCTURE
Filed Jan. 11, 1946

INVENTOR
WILLIAM L. TRACY
BY
Herbert H. Thompson
his ATTORNEY.

Patented Apr. 18, 1950

2,504,166

UNITED STATES PATENT OFFICE 2,504,166

GIMBAL MOUNTING STRUCTURE

William Low Tracy, Port Washington, N. Y., assignor to The Sperry Corporation, a corporation of Delaware Application January 11, 1946, Serial No. 640,665

8 Claims. (Cl. 74—5)

This invention relates to a gimbal mounting structure providing an air passageway therethrough. In the illustrated embodiment of the invention, the mounting is employed in a gyro instrument that may include pneumatic erection controls and/or a pneumatically spun rotor.

An object of the invention is to prevent the air passing through the mounting from subjecting the shaft or trunnion to moments of an undesired character that may turn the same about the axis thereof.

A feature of the invention resides in the staggered arrangement of the openings in the projection and shaft parts of the mounting to direct air substantially parallel to the axis of the shaft.

Another feature of the invention consists in the air gap formation situated between the spaced bearings of the mounting and between the shaft or gimbal trunnion and projection parts thereof.

A further object of the invention is to provide a mounting of this character having a readily replaceable filter element having a very large filter area for filtering the air passing therethrough.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects, features and structural details of the invention will be more apparent from the following description taken in connection with the accompanying drawing in which the preferred form of the invention is shown.

Figure 1:
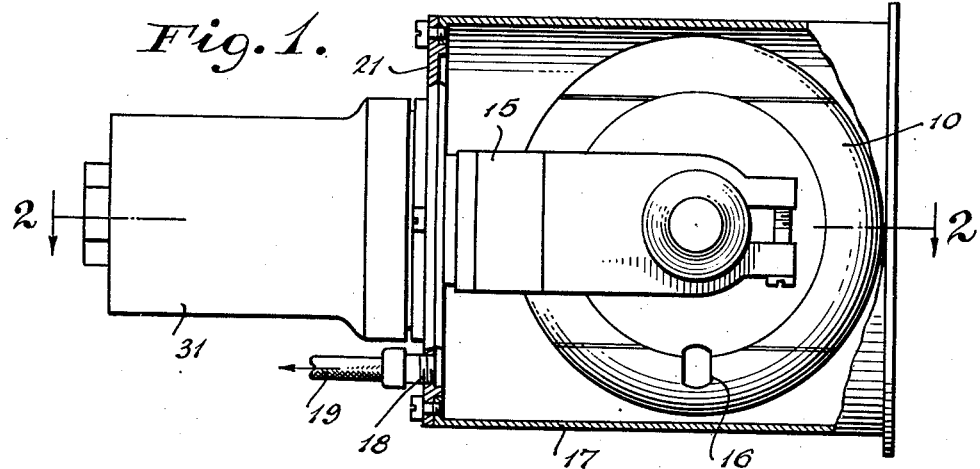
Fig. 1 is a side elevation of an instrument in which the present inventive concepts are embodied with the casing or housing thereof illustrated in section to show the interior of the instrument.
Figure 2:
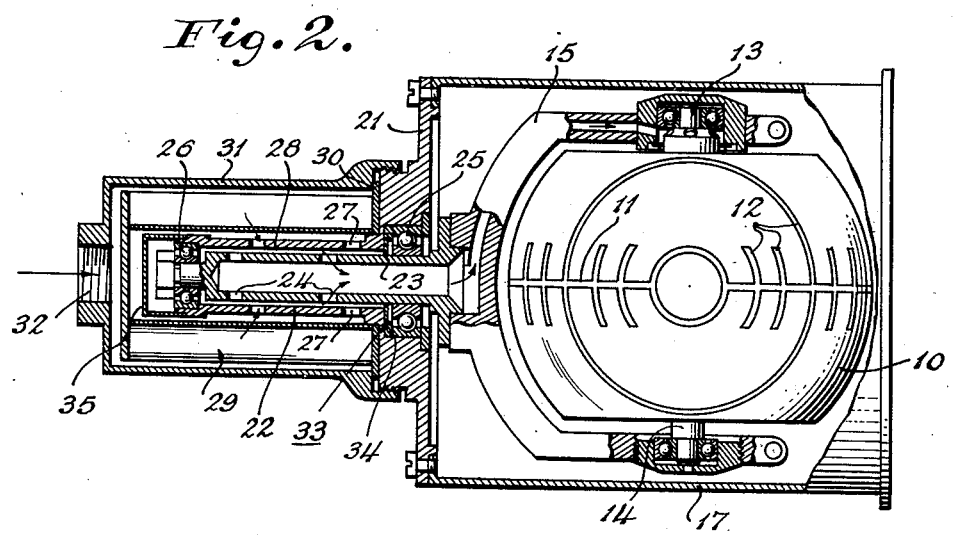
Fig. 2 is a plan view of the instrument illustrated in Fig. 1 with the improved shaft mounting shown therein in horizontal section.

With reference to the drawing, the invention is illustrated in a pneumatically operated and erected gyro instrument of the character shown and described in copending application Serial No. 638,858, filed January 3, 1946 by the present inventor. This instrument is a gyro vertical whose universally supported rotor frame or case is encircled by a generally spherical shell 10 having a central meridian line 11 thereon and a number of spaced latitude lines 12 that intersect the meridian line. Within the shell 10 is a conventional rotor case or frame (not shown) which contains a gyro rotor that is adapted to spin about a substantially vertical axis. The rotor case or frame includes trunnions 13 and 14 that journal in suitable bearings on the U-shaped gimbal ring 15 of the illustrated gyro instrument. As shown, the gimbal is hollow and trunnion 13 has openings therein to permit the flow of air into the rotor case or frame for the purpose of both spinning the gyro rotor and providing the erection force of the instrument. The present invention is not concerned with either of these functions so no detail showing of the same is made in the drawing. In the present instance, air is exhausted from the rotor case or frame through a number of openings in the shell, one of which is indicated at 16 in Fig. 1. The illustrated pneumatic instrument includes an air-tight housing or casing indicated at 17 within which the movable parts of the device are situated. As shown, the air may be withdrawn from the housing 17 by way of a vent 18 in one of the walls thereof and a hose connection 19 that is connected to a suitable pump (not shown). Air is admitted to the rotor case or frame in accordance with the teaching of the present invention from the atmosphere by way of the hollow gimbal ring 15 as hereinafter described. The gyro instrument shown is only employed to demonstrate the utility of the invention. It is desired to point out that the invention is also applicable to other pneumatic instruments in which air is employed interiorly of a closed housing to perform work and the supply of air is obtained from the outside of the housing by way of a hollow pivot or shaft.

In accordance with the present invention, the closed housing or casing 17 includes a rear wall 21 that is suitably connected thereto. The wall 21 is constructed to include an external boss or projection 22 that provides an opening in the housing or casing 17 into which the hollow trunnion 23 of the gimbal ring 15 extends. It is understood that elongated trunnion 23 shown in the drawing is the equivalent of a hollow shaft. Trunnion 23 has a number of relatively axially spaced and circumferentially spaced openings therein that extend radially of the axis thereof.

The trunnion openings are indicated at 24. The external projection 22 of wall 21 is tubular in form and provides a support or mounting for the outside races of two axially spaced ball bearings 25 and 26 that define the axis of the trunnion or shaft 23. It also houses an air seal ring 33 and plate 34 which prevents air from leaking into the casing 17 through bearing 25. Air is prevented from leaking through bearing 26 by means of a cap 35 which fits upon the end of the projection 22. The trunnion is constructed to include the inner races of the spaced friction bearings 25 and 26, the same extending through the opening in the wall 21 to engage the bearings in the projection 22 of the mounting. Projection 22 of the mounting further includes a number of relatively axially spaced and circumferentially spaced openings 27 therein that extend in a radial direction from the axis of the trunnion 23. The improved mounting further provides an air passageway indicated at 28 in the form of a close or narrow air gap situated between the bearings 25 and 26 and between the gimbal trunnion and projection parts thereof. As indicated the plural number of openings in the projection 22 and the trunnion 23 are nonoverlapping or non-registering so as the air enters the gap 28 it flows along and around the surface of the trunnion and substantially parallel to the axis thereof before entering the openings 24. This construction prevents any undesired moments from being exerted on the gimbal due to the passage of air into the hollow trunnion thereof. The openings 24 and 27 are axially spaced along the axis of the trunnion or hollow shaft 23.

Figure 3:
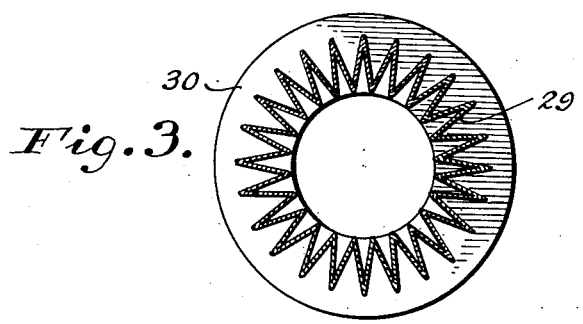
Fig. 3 is a detail end view of the filter element employed in the improved mounting.

The mounting further includes a filter element 29 that envelops the projection 22. Element 29 is attached or secured to wall 21 by means of flange portion 30 which is engaged by one end of a bell-shaped cover 31 that is threaded to engage an exterior portion of the wall 21. Cover 31 provides a means for mounting or securing the filter member so that the same may be readily replaced when necessary. As shown, cover 31 includes an opening 32 at one end thereof which permits air to enter the same from the atmosphere. In the instrument illustrated, the air then passes through the filter element 29 and reaches the gimbal 15 by way of openings 27 in the projection 22, the air passageway 28 and openings 24 in the hollow trunnion or shaft 23. As illustrated in Fig. 3 the filter element 29 is in the form of a substantially wide strip of filter material which is overbent to form a serrated surface. The ends thereof are then joined so as to form a fluted cylinder having very sharp crests and valleys. Such a configuration provides a very large surface area of filtering material for filtering the air passing therethrough. This construction greatly increased the efficiency of the filter while at the same time greatly increased the useful life thereof. It will be understood as far as the invention is concerned that it is immaterial whether the air is pulled through the mounting by a suction pump (not shown) connected to hose 19 or is pushed through the mounting by a suitable pump (not shown) whose output is directly supplied to the cover 31 at the opening 32 thereof.

While the construction disclosed in the present application is particularly adaptable to pneumatic gyroscopic instruments, the invention is not necessarily limited thereto, but the construction may be advantageously employed in any pneumatic instrument where it is desired to direct air from the atmosphere through a hollow extension to the interior of a housing wherein it is essential that no torques be exerted on the extension by the air passing thereinto.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a pneumatic gyro instrument with a gimbal, an air-passageway-defining mounting for the gimbal including an air-tight housing having a wall with an external hollow projection having two axially spaced friction bearings therein that define the axis of the gimbal, an elongated hollow trunnion at one end of the gimbal that engages the spaced bearings in the projection, an air passageway in said mounting in the form of a close air gap situated between the spaced friction bearings and between the gimbal trunnion and projection, said trunnion and projection each having a plurality of openings, said openings lying in zones spaced therealong and between said spaced bearings, and the openings in said trunnion and projection lying respectively in non-registering zones for all angular positions of said trunnion relative to said projection, whereby no torques will be exerted on said gimbal by the air entering said hollow trunnion from the atmosphere for all angular positions of said trunnion relative to said projection.

2. An instrument as claimed in claim 1, including a filter element mounted on the wall of the housing and enveloping the projection in radially spaced relation thereto, a cover member having an opening therein for admitting air from the atmosphere to the interior thereof and provided at one end thereof with means for securing said filter element and said cover to said housing wall.

3. An instrument as claimed in claim 1, including an air seal ring mounted in the projection adjacent the inner of the bearings relative to the housing.

4. An instrument as claimed in claim 1, including an air seal cap mounted on the end of the projection.

5. In a pneumatic instrument with a hollow member having an air duct therein, an air-passageway-defining mounting for the member including an air-tight housing having a wall with an external hollow projection having two axially spaced friction bearings that define the axis of the member, a hollow extension on said member that engages the spaced friction bearings in the projection, an air passageway in said mounting in the form of a close air gap between the bearings and between the hollow extension and the projection, said extension and projection each having a plurality of peripherally and axially spaced openings therein, said openings lying in zones spaced therealong and between said spaced bearings, and the openings in said extension and projection lying respectively in non-registering zones for all angular positions of said extension relative to said projection, whereby no torques will be exerted on said member by the air entering said hollow extension from the atmosphere for all angular position of said extension relative to said projection.

6. An instrument as claimed in claim 5, including an elongated filter element mounted on the wall of the housing and enveloping the projection in radially spaced relation thereto, a cover member for said projection and filter element having an opening in one end thereof for admitting air from the atmosphere to the interior thereof, and cooperable means on said housing wall and the other end of said cover for securing said filter element and cover to said housing wall.

7. In a pneumatic gyro instrument with a gimbal, an air-passageway-defining mounting for the gimbal including a housing wall with a hollow external projection having two axially spaced bearings that define the axis of the gimbal, an elongated hollow trunnion at one end of the gimbal that engages the spaced bearings in the projection, an air passageway in said mounting in the form of a close air gap situated between the bearings and between the gimbal trunnion and projection, said trunnion and projection each having a plurality of peripherally and axially spaced openings, said openings lying in zones axially spaced therealong and between said spaced bearings, and the openings in said trunnion and projection lying respectively in non-registering zones for all angular position of said trunnion relative to said projection, whereby no torques will be exerted on said gimbal by the air entering said hollow trunnion from the atmosphere from all angular positions of said trunnion relative to said projection.

8. In a pneumatic instrument with a hollow member having an air duct therein, an air-passageway-defining mounting for the member including a housing wall with a hollow external projection having two axially spaced bearings that define the axis of the member, a hollow extension on said member that engages the spaced bearings in the projection, an air passageway in said mounting in the form of a close air gap between the bearings and between the extension and the projection, said extension and projection each having a plurality of peripherally and axially spaced openings, said openings lying in zones axially spaced therealong and between said spaced bearings, and the openings in said extension and projection lying respectively in non-registering zones for all angular positions of said extension relative to said projection, whereby the air entering the openings in said projection is caused to flow along and around the exterior surface of said extension before entering the openings therein to thereby eliminate any torques being exerted on said member for all angular positions of said extension relative to said projection.

WILLIAM LOW TRACY.

REFERENCES CITED

The following references are of record in the file of this patent:

UNITED STATES PATENTS

| Number | Name | Date |
|---|---|---|
| 1,988,591 | Gillmor | Jan. 22, 1935 |
| 1,996,895 | Bennett | Apr. 9, 1935 |
| 2,157,360 | Thompson | May 9, 1939 |
| 2,293,707 | Braddon | Aug. 25, 1942 |